US006854892B2

(12) United States Patent
Lauck et al.

(10) Patent No.: US 6,854,892 B2
(45) Date of Patent: Feb. 15, 2005

(54) BAFFLED CENTRIFUGAL LUBRICATION SPACER

(75) Inventors: Kenneth L. Lauck, Beacon Falls, CT (US); Andrew David Redman, Stevenson, CT (US)

(73) Assignee: Sikorsky Aircraft Corporation, Stratford, CT (US)

(*) Notice: Subject to any disclaimer, the term of this patent is extended or adjusted under 35 U.S.C. 154(b) by 56 days.

(21) Appl. No.: 10/395,737

(22) Filed: Mar. 24, 2003

(65) Prior Publication Data

US 2004/0190806 A1 Sep. 30, 2004

(51) Int. Cl.[7] .............................................. F16C 33/66
(52) U.S. Cl. ........................ 384/462; 384/465; 384/466
(58) Field of Search .......................... 384/462, 464–466, 384/471–475

(56) References Cited

U.S. PATENT DOCUMENTS

| 1,378,658 | A | * | 5/1921 | Clement et al. ............ 384/472 |
| 2,272,757 | A | * | 2/1942 | Tcker ......................... 384/466 |
| 3,759,592 | A | * | 9/1973 | Carlson ....................... 384/465 |
| 4,006,944 | A | * | 2/1977 | Ando et al. .................. 384/466 |
| 5,102,240 | A | * | 4/1992 | Oehy et al. .................. 384/472 |
| 5,735,676 | A | * | 4/1998 | Loos .......................... 417/407 |
| 5,803,616 | A | * | 9/1998 | Persson et al. .............. 384/473 |

* cited by examiner

Primary Examiner—Thomas R. Hannon
(74) Attorney, Agent, or Firm—Bachman & LaPointe, P.C.

(57) ABSTRACT

The present invention relates to a spacer arrangement used in a duplex bearing system. The spacer arrangement has a lubricant chamber, a first spacer element within the lubricant chamber having a centrifugal ramp, and a second spacer element within the lubricant chamber having a baffle. The baffle divides the lubricant chamber into first and second chambers with each chamber communicating with one of the bearings in the duplex bearing system. The centrifugal ramp counteracts the effects of gravity and uses centrifugal forces to insure a supply of lubricant to one of the bearings, typically an upper bearing, in the duplex bearing system. The spacer arrangement has particular utility in a swashplate assembly used in helicopters, which swashplate assembly includes a stationary swashplate and a rotating swashplate with the duplex bearing arrangement being located between the two swashplates.

17 Claims, 2 Drawing Sheets

BAFFLED CENTRIFUGAL LUBRICATION SPACER

BACKGROUND OF THE INVENTION

The present invention relates to a system for insuring that an upper bearing of a duplex bearing system is provided with an adequate supply of a lubricant and to a spacer arrangement for use in a duplex bearing system. The spacer arrangement of the present invention has particular utility in swashplate systems used on helicopters.

Swashplate systems used in helicopters currently use a duplex bearing system such as that shown in FIG. 1. As shown therein, the swashplate system 10 includes a stationary swashplate 12, a rotating swashplate 14, and a duplex bearing system 16 between the two. The duplex bearing system has an upper bearing 18 and a lower bearing 20. A chamber 22 is situated between the upper bearing 18 and a lower bearing 20 and is supplied with a lubricant such as grease via an inlet 24 and a grease gun (not shown). The chamber 22 has a set of spacers 26 and 28 which separate the bearings so that they can better resist control moments from the pushrods.

In this swashplate system, the initial pressure from the grease gun is relied upon to overcome gravity and force grease into the cavity 30 for the upper bearing 18. The disadvantage of this system is that after the initial application gravity tends to remove the lubricant from the upper bearing cavity 30.

SUMMARY OF THE INVENTION

Accordingly, it is an object of the present invention to provide an improved spacer arrangement for use in a bearing system.

It is a further object of the present invention to provide an improved spacer arrangement as above which insures that an upper bearing of a duplex bearing arrangement gets an adequate supply of lubricant during operation.

The foregoing objects are attained by the baffled centrifugal lubrication spacer of the present invention.

In accordance with the present invention, a spacer arrangement is provided for use with a duplex bearing arrangement. The spacer arrangement comprises a lubricant chamber, a first spacer element with a baffle within the lubricant chamber, and a second spacer element with a centrifugal ramp. The spacer element with the centrifugal ramp and the spacer element with the baffle divide the lubricant chamber into a first chamber from which lubricant is supplied to an upper bearing and a second chamber from which lubricant is supplied to a lower bearing.

Other details of the baffled centrifugal lubrication spacer, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
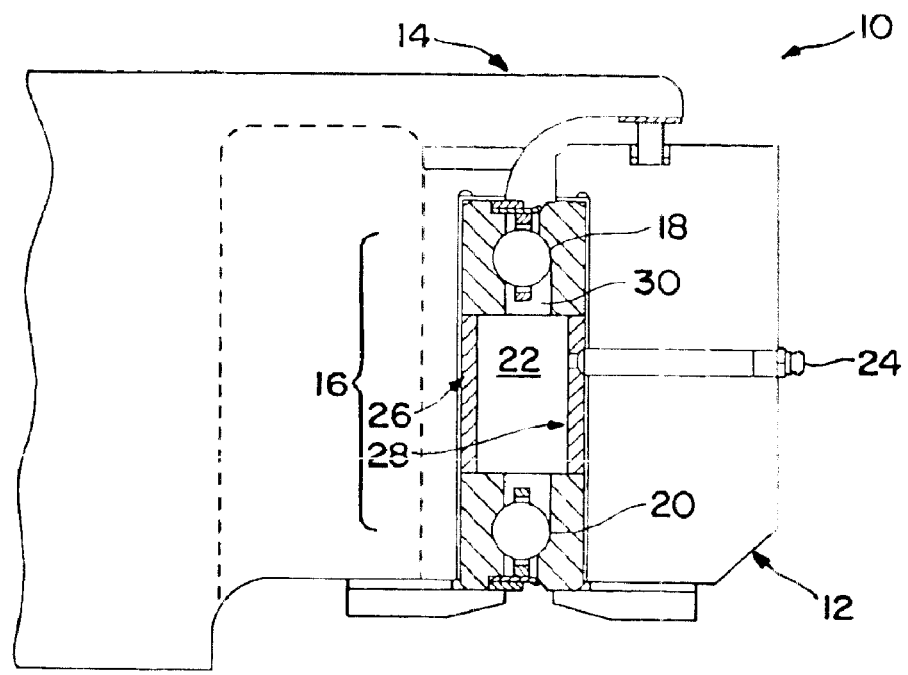
FIG. 1 is a schematic representation of a prior art lubrication spacer system for a swashplate assembly.
Figure 2:
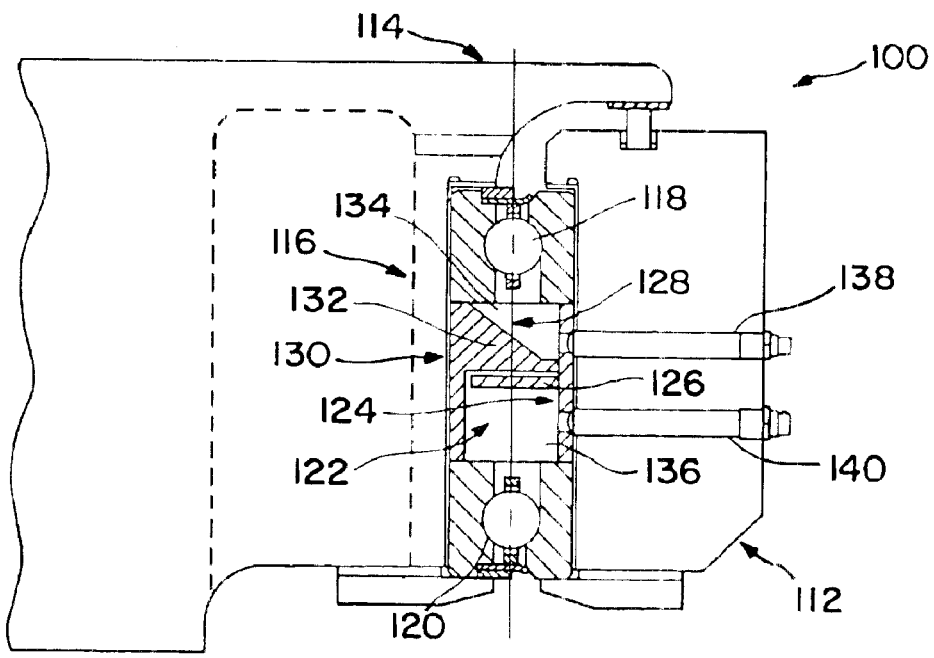
FIG. 2 is a schematic representation of a baffled centrifugal lubrication spacer in accordance with the present invention.

Referring now to FIG. 2, a swashplate system 100 having a stationary swashplate 112 and a rotating swashplate 114 is illustrated. A duplex bearing system 116 having an upper bearing 118 and a lower bearing 120 is provided between the stationary swashplate 112 and the rotating swashplate 114. A lubricant chamber 122 is provided between the upper bearing 118 and the lower bearing 120. Within the lubricant chamber 122 is a first spacer 124 having an integrally formed baffle 126. The baffle 126 extends preferably in a direction substantially normal to an axis 128 extending from the upper bearing 118 to the lower bearing 120. Also within the lubricant chamber 122 is a second spacer 130 having an integrally formed centrifugal ramp structure 132. The spacers 124 and 130, as well as the baffle 126 and the centrifugal ramp structure 132, may be formed from any suitable material known in the art. For example, these components may be formed from aluminum or aluminum alloys.

As can be seen from FIG. 2, the baffle 126 and the centrifugal ramp structure 132 divide the lubrication chamber 122 into a first or upper chamber 134 and a second or lower chamber 136. Each of the chambers 134 and 136 communicates with a lubricant source (not shown) via inlets 138 and 140 respectively. The lubricant source may be a source of grease such as a grease gun or a source of some other form of lubricant.

In operation, as the swashplate 114 rotates relative to the swashplate 112, the baffle 126 serves to counteract the effect of gravity and retain the lubricant in the upper chamber 134. Additionally, the centrifugal ramp structure 132 drives the lubricant back up to the upper bearing 118 during operation using centrifugal forces.

Figure 3:
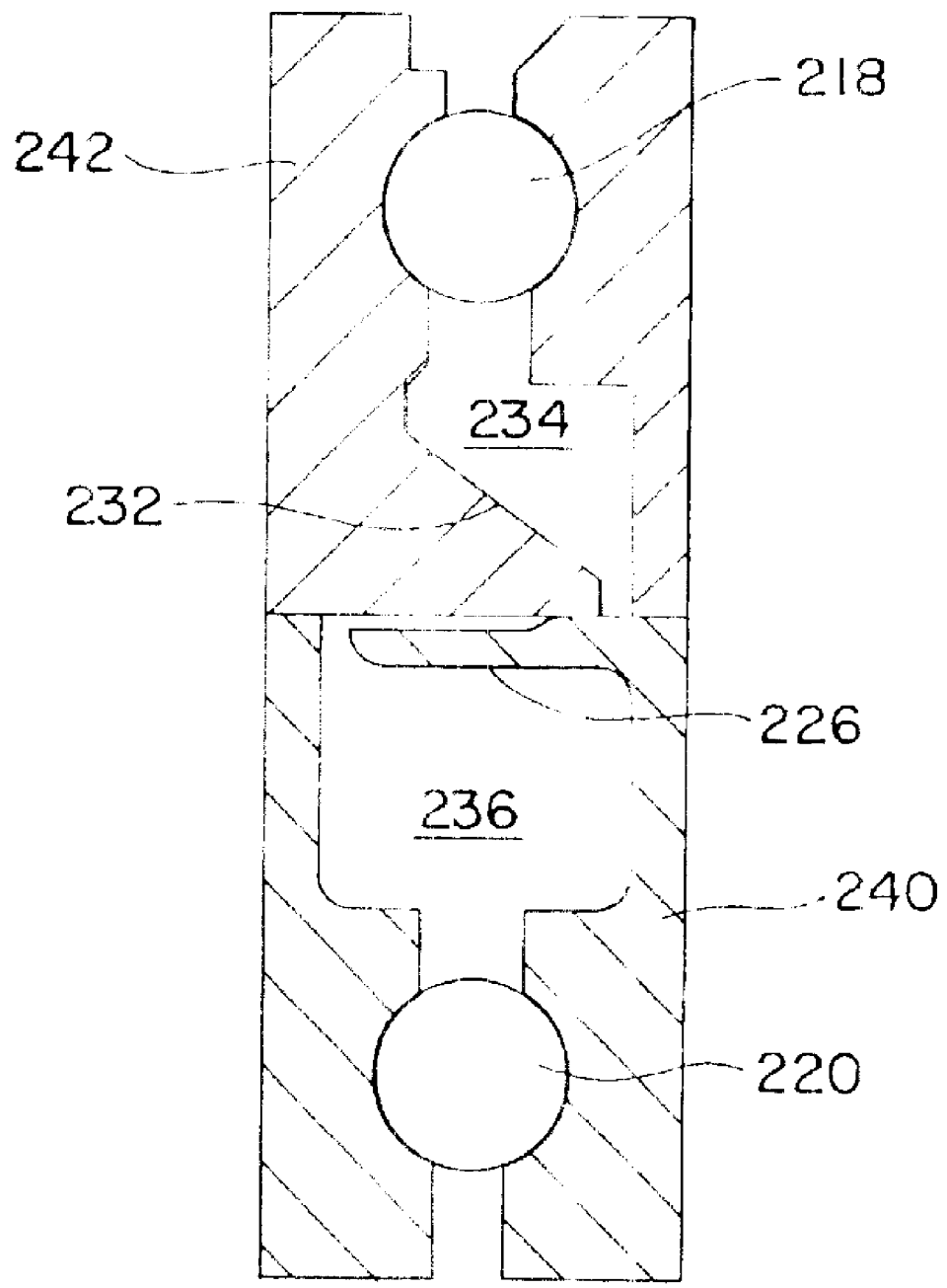
FIG. 3 illustrates an alternative embodiment of a baffled centrifugal lubrication system.

FIG. 3 illustrates an alternative arrangement for a duplex bearing system used in a swashplate assembly. The arrangement includes an upper bearing 218, a lower bearing 220, a baffle 226, and a centrifugal ramp structure 232. In this system, spacers are eliminated by incorporating the baffle 226 into the lower bearing race 240 and incorporating the centrifugal ramp into the upper bearing race 242. As can be seen from the figure, the upper bearing 218 is supplied with lubricant from the chamber 234, while the lower bearing 220 is supplied with lubricant from the chamber 236. Any suitable means known in the art (not shown) may be used to supply the chambers 234 and 236 with lubricant.

While the spacer system of the present invention has been described in the context of a swashplate system, it should be recognized that it has broader utility. Namely, the baffled centrifugal lubrication spacer may be used in duplex bearing arrangements used in other types of systems that encounter the same or similar problems.

It is apparent that there has been provided in accordance with the present invention a baffled centrifugal lubrication spacer which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A system comprising:

a first bearing;

a second bearing spaced from said first bearing;

a lubricant chamber intermediate the first bearing and the second bearing;

spacer means for dividing said lubricant chamber into a first chamber for supplying lubricant to said first bearing and a second chamber for supplying lubricant to said second bearing; and said spacer means including a first spacer element with an integrally formed baffle and a second spacer element with an integrally formed centrifugal ramp for counteracting gravity and for using centrifugal force to supply said lubricant to one of said first and second bearings.

2. A system according to claim 1, wherein said first spacer element is located along a first side of said lubricant chamber and said second spacer is located along a second side of said lubricant chamber.

3. A system according to claim 1, further comprising a first means for introducing lubricant into said first chamber and a second means for introducing lubricant into said second chamber.

4. A system according to claim 1, wherein said first and second bearings are located between a stationary swashplate and a rotating swashplate.

5. A bearing arrangement comprising:

an upper bearing;

a lower bearing;

a lubricant chamber;

a first spacer element with a baffle for dividing said lubricant chamber into upper and lower chambers; and a second spacer element having a centrifugal ramp for counteracting gravitational effects and for using centrifugal forces to insure that said upper bearing is supplied with lubricant.

6. A bearing arrangement according to claim 5, wherein said upper bearing and said lower bearing are each positioned between a stationary swashplate and a rotating swashplate.

7. A bearing arrangement according to claim 5, further comprising a first means for supplying said upper chamber with said lubricant and second means for supplying said lower chamber with said lubricant.

8. A bearing arrangement according to claim 5, wherein said centrifugal ramp overlaps said baffle.

9. A bearing arrangement according to claim 5, wherein said first spacer element is positioned along a first side of said lubricant chamber and said second spacer element is positioned along a second side of said lubricant chamber.

10. A swashplate assembly comprising:

a stationary swashplate;

a rotating swashplate;

a bearing arrangement between said stationary swashplate and said rotating swashplate;

a lubricant chamber for supplying lubricant to said bearing arrangement; and first means within said lubricant chamber for counteracting the effects of gravity and for using centrifugal force to supply lubricant to said bearing arrangement.

11. A swashplate assembly comprising:

a stationary swashplate;

a rotating swashplate;

a bearing arrangement between said stationary swashplate and said rotating swashplate;

a lubricant chamber for supplying lubricant to said bearing arrangement;

first means within said lubricant chamber for counteracting the effects of gravity and for using centrifugal force to supply lubricant to said bearing arrangement; and baffle means within said lubricant chamber for dividing the lubricant chamber into first and second chambers.

12. A swashplate assembly according to claim 11, further comprising means for independently supplying lubricant to said first and second chambers.

13. A swashplate assembly according to claim 11, wherein said first means comprises a first spacer element positioned along a first side of said lubricant chamber, said first spacer element having an integrally formed centrifugal ramp, and wherein said baffle means comprises a second spacer element positioned along a second side of said lubricant chamber, said second spacer element having an integrally formed baffle.

14. A swashplate assembly according to claim 13, wherein said centrifugal ramp overlaps said baffle.

15. A swashplate assembly comprising:

a stationary swashplate;

a rotating swashplate;

a bearing arrangement between said stationary swashplate and said rotating swashplate;

a lubricant chamber for supplying lubricant to said bearing arrangement;

first means within said lubricant chamber for counteracting the effects of gravity and for using centrifugal force to supply lubricant to said bearing arrangement; and said bearing arrangement including an upper bearing and a lower bearing and said first means insuring a supply of lubricant to said upper bearing.

16. A swashplate assembly comprising:

a stationary swashplate;

a rotating swashplate;

a bearing arrangement between said stationary swashplate and said rotating swashplate;

a lubricant chamber for supplying lubricant to said bearing arrangement;

first means within said lubricant chamber for counteracting the effects of gravity and for using centrifugal force to supply lubricant to said bearing arrangement; and said bearing arrangement including a first bearing and a second bearing and said first means insuring a supply of lubricant to at least one of said first and second bearings.

17. A bearing system comprising:

a first bearing and a second bearing spaced from the first bearing;

a first race for supporting the first bearing, said first race having means for counteracting the effects of gravity and for using centrifugal force to supply lubricant to said first bearing; and a second race having an integrally formed baffle, said second race supporting said second bearing.

* * * * *